United States Patent [19]
Burth

[11] Patent Number: 5,979,286
[45] Date of Patent: Nov. 9, 1999

[54] WIRE INSULATION STRIPPING DEVICE

[76] Inventor: Donald J. Burth, 867 Willow Lake Dr., Sagamore Hills, Ohio 44067

[21] Appl. No.: 08/736,269

[22] Filed: Oct. 24, 1996

Related U.S. Application Data

[63] Continuation-in-part of application No. 08/458,426, Jun. 2, 1995, abandoned, which is a continuation-in-part of application No. 08/155,104, Nov. 19, 1993, abandoned, which is a continuation-in-part of application No. 08/016,793, Feb. 11, 1993, abandoned

[60] Provisional application No. 60/005,941, Oct. 26, 1995.

[51] Int. Cl.[6] ........................................... H02G 1/12
[52] U.S. Cl. ............................... 83/861; 83/856; 83/947; 30/90.8; 81/9.51
[58] Field of Search ..................... 30/90.1, 90.3, 30/90.4, 90.8, 90.9, 91.1, 91.2, 92.5, 90.2, 90.6, 90.7; 83/924, 947, 54, 856, 881; 81/9.41, 9.42, 9.51, 9.4

[56] References Cited

U.S. PATENT DOCUMENTS

| | | | |
|---|---|---|---|
| 1,885,944 | 11/1932 | Pedersen | 30/90.7 |
| 1,979,487 | 11/1934 | Pedersen | 30/90.7 |
| 2,288,670 | 7/1942 | Babiary | 30/90.9 X |
| 2,346,227 | 4/1944 | Martin et al. | 30/90.9 |
| 2,353,128 | 7/1944 | Demetropoulos | 30/90.9 |
| 2,385,368 | 9/1945 | Montgomery | 30/90.9 X |
| 2,683,308 | 7/1954 | Cook, Jr. | 30/91.1 |
| 3,057,232 | 10/1962 | Cornell, Jr. | 81/9.5 |
| 3,722,092 | 3/1973 | Lukas | 30/90.9 |
| 3,886,655 | 6/1975 | Molnar | 30/90.3 |
| 3,988,826 | 11/1976 | Heikkala | 30/90.4 |
| 4,265,016 | 5/1981 | Ducret | 30/90.8 |
| 4,449,298 | 5/1984 | Putz | 30/90.1 |
| 4,463,494 | 8/1984 | Bianco, Jr. | 30/90.4 |
| 4,615,116 | 10/1986 | Hanson et al. | 30/90.4 |
| 4,656,893 | 4/1987 | Hudson | 81/9.51 |
| 5,050,302 | 9/1991 | Mills | 30/90.8 |
| 5,140,751 | 8/1992 | Faust | 30/91.1 |
| 5,337,479 | 8/1994 | Ducret | 30/90.6 |

FOREIGN PATENT DOCUMENTS

| | | | |
|---|---|---|---|
| 122 009 | 6/1948 | Sweden | 30/90.4 |
| 607-389 | 12/1978 | Switzerland | 30/90.4 |

*Primary Examiner*—Clark F. Dexter
*Attorney, Agent, or Firm*—Pearne, Gordon, McCoy & Granger LLP

[57] ABSTRACT

A device for stripping insulation from wire. The device includes detachable wire guide members and a rectangular metal frame with a horizontal wire-receiving passageway therethrough. A slitting knife mounted on the frame projects downwardly into the passageway a distance sufficient to cut through the full thickness of the insulation. The slitting knife is vertically adjustable, and the horizontally adjustable guide members align the insulated wire beneath the slitting knife. The insulated wire may be manually or mechanically pulled through the horizontal wire-receiving passageway, causing the insulation to be slit.

17 Claims, 6 Drawing Sheets

WIRE INSULATION STRIPPING DEVICE

This is a continuation-in-part of provisional application Ser. No. 60/005,941, filed Oct. 26, 1995, and prior application Ser. No. 08/458,426, filed Jun. 2, 1995, now abandoned which was a continuation-in-part of prior application Ser. No. 08/155,104, filed Nov. 19, 1993, now abandoned, which in turn was a continuation-in-part of application Ser. No. 08/016,793, filed Feb. 11, 1993, now abandoned.

BACKGROUND OF INVENTION

1. Field of Invention:

The field of this invention relates to means for removing insulation from insulated electrical conductors.

2. Description of Related Art:

The most commonplace tool known by Applicant for removing short lengths of insulation from electrical conductors is the electrician's stripping pliers. This tool has plier pincers equipped with graduated matching serrations, each pair of serrations being designed to cut the insulation of a particular size of electrical conductor. By serrating the insulation approximately one inch from the end of a conductor, the electrician can slip the serrated portion from the end of the conductor. The use of these pliers is generally limited to wires with small diameters ranging from 18 AWG to 8 AWG (0.146 to 0.328 inches). To remove more than a few inches of insulation from a conductor in the field, it has been necessary heretofore to axially slit the insulation with a knife, and then peel the insulation away from the conductor.

Prior to EPA restrictions, conductor insulation had been mass removed in the field by burning. To Applicant's knowledge, no satisfactory substitute for burning conductors in the field has been developed.

SUMMARY OF THE INVENTION

The invention is primarily intended for use by electrical contractors, maintenance departments of manufacturing companies, hospitals, universities, and similar institutions, as well as organizations professionally engaged in wire salvage operations. Since random lengths of scrap insulated copper wire have a present market value of approximately thirty cents a pound, and bare copper wire has a present market value of approximately eighty-five cents a pound, the subject invention is a valuable tool for value-added copper wire salvaging. The primary purpose, therefore, of the subject invention is to provide a tool to reclaim copper from scrap insulated copper, aluminum, and/or other conductors.

Because of the high cost of large size conductors such as in the 250 to 2000 AWG range (0.868 to 2.021 inches in diameter), their lengths are carefully measured by craftsmen so as to minimize scrap loss. Also, footage required of heavy gauge conductors is not nearly so great as the footage required of smaller sized conductors, such as in the 14 to 8 AWG range (0.171 to 0.318 inches in diameter). This factor also tends to reduce the quantity of large-gauge scrap conductor available for reclamation. It is for this reason that the preferred embodiments of the invention are designed to reclaim the smaller gauges of insulated wire, which provide the greatest quantity of reclaimable copper, aluminum, and/ or other conductor material.

A preferred embodiment of the invention includes a one-piece casting frame having a top, bottom, and spaced-apart vertical side walls, preferably of aluminum and rectangular in profile. A fixed wire insulation cutting knife is mounted in a knife-holding bracket adapted to freely slide vertically between the interior vertical walls of the frame. A hexahedron support block having limited pivotal movement about a horizontal pivotal mounting pin is also mounted between the interior vertical walls and beneath the knife. A pair of wire guide plates adapted to horizontally align a wire placed therebetween on the block and beneath the cutting edge of the knife is slidably mounted on the support block. After the wire alignment plates have been properly positioned on the support block, they may be secured in place by set screws or other fastening means. Each wire alignment plate is shiftable independent of the other wire alignment plates. Both the hexahedron wire support block and the wire alignment plates are preferably made from nylon.

For ease of assembly and maintenance, the knife-holding bracket is formed from two segments. One segment includes a track follower to slide vertically over a front track surface of the front face of the frame. The other segment also includes a track follower to vertically slide over a rear track surface of the rear face of the frame. When the two segments have been assembled between the interior vertical walls of the frame, threaded fasteners secure them together. A shaft is threadedly mounted in the top portion of the frame which spans the vertical side walls. The connection of the shaft to the knife bracket is such that rotation of the shaft vertically shifts the knife.

The operator inserts an insulated wire between the frame vertical walls to rest on the top surface of the wire support block between the pair of wire alignment plates. The wire alignment plates are each manually moved inwardly toward the wire until both plates make contact with the wire. If the wire is directly aligned beneath the cutting edge of the knife, set screws then secure the plates in place. If the wire is not in alignment with the knife, the plates are shifted in unison until there is proper alignment, and then the set screws secure the plates in place. Rotation of the threaded shaft lowers the cutting edge of the knife into wire insulation slitting position. When the knife is in position, a set screw or any other standard clamping means may also secure the threaded shaft in place. The operator then manually or mechanically pulls the insulated wire through the frame, whereby the insulation is slit down to the wire core and may be easily peeled from the wire upon leaving the frame.

OBJECTS OF THE INVENTION

It is, therefore, among the objects of the invention to provide means for total stripping of electrical conductor insulation in the field, quickly, economically, and easily, without pollution; to provide a tool for stripping conductor insulation in the field that is reliable, durable, quick to set up, and easy and fast to use; to provide a tool to strip conductor insulation that is not limited in the size of the conductor that can be processed in the field; and to provide a tool that is easy to clean, rugged, substantially maintenance free, inexpensive, and simple to manufacture.

The foregoing and other features of the invention will become apparent from the following description of preferred embodiments of the invention, with reference to the accompanying drawings.

BRIEF DESCRIPTION OF THE DRAWINGS

FIG. 15 is an exploded perspective view in elevation of a wire stripping tool holder similar to the tool holder of FIGS. 1 and 2 with means to secure the holder to a work bench or the like;

FIG. 16 is a perspective view in elevation of a wire stripping tool holder similar to the tool holder of FIG. 15, including means to secure the holder in a vise or the like;

FIG. 17 is a perspective view in elevation of a wire guide adapted to be mountable on the tool holders of FIGS. 15 and 16;

FIG. 18 is an elevational view of a crank handle for moving a cutting blade into and out of cutting engagement with the insulation of an insulated wire; and FIG. 19 is a perspective view in elevation of another preferred embodiment of the invention shown in FIG. 1.

DESCRIPTION OF PREFERRED
EMBODIMENTS OF THE INVENTION

Figure 2:
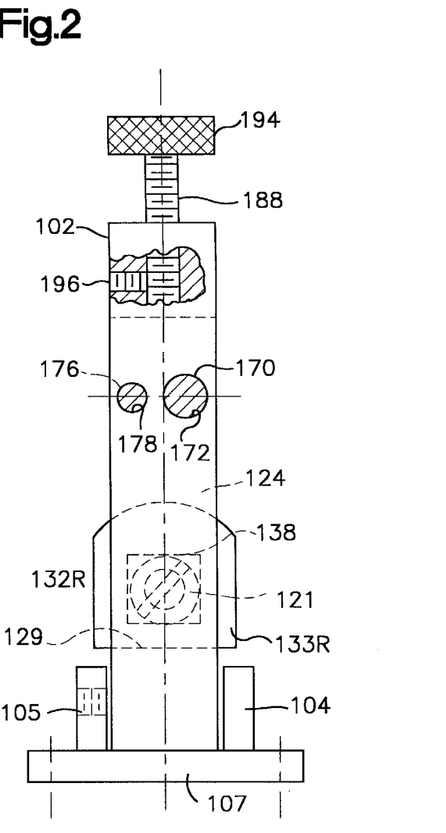
FIG. 2 is a partially fragmentary side elevational view of the preferred embodiment of the invention shown in FIG. 1.
Figure 3:
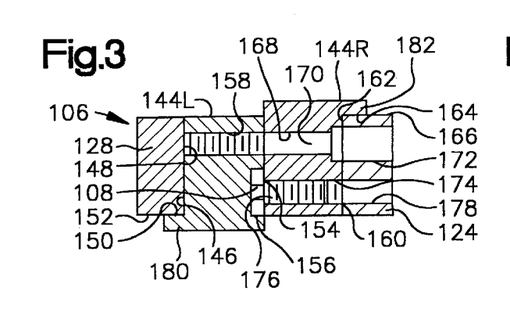
FIG. 3 is a sectional view of the invention taken along the line 3—3 of FIG. 1.
Figure 4:
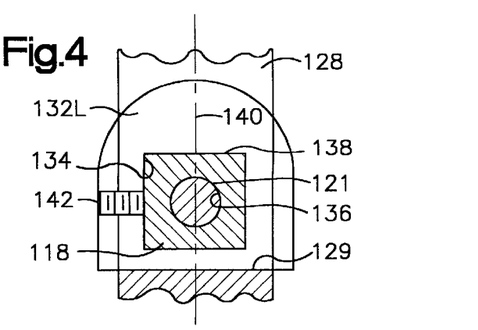
FIG. 4 is an enlarged fragmentary sectional view of the invention taken substantially along the line 4—4 of FIG. 1.
Figure 5:
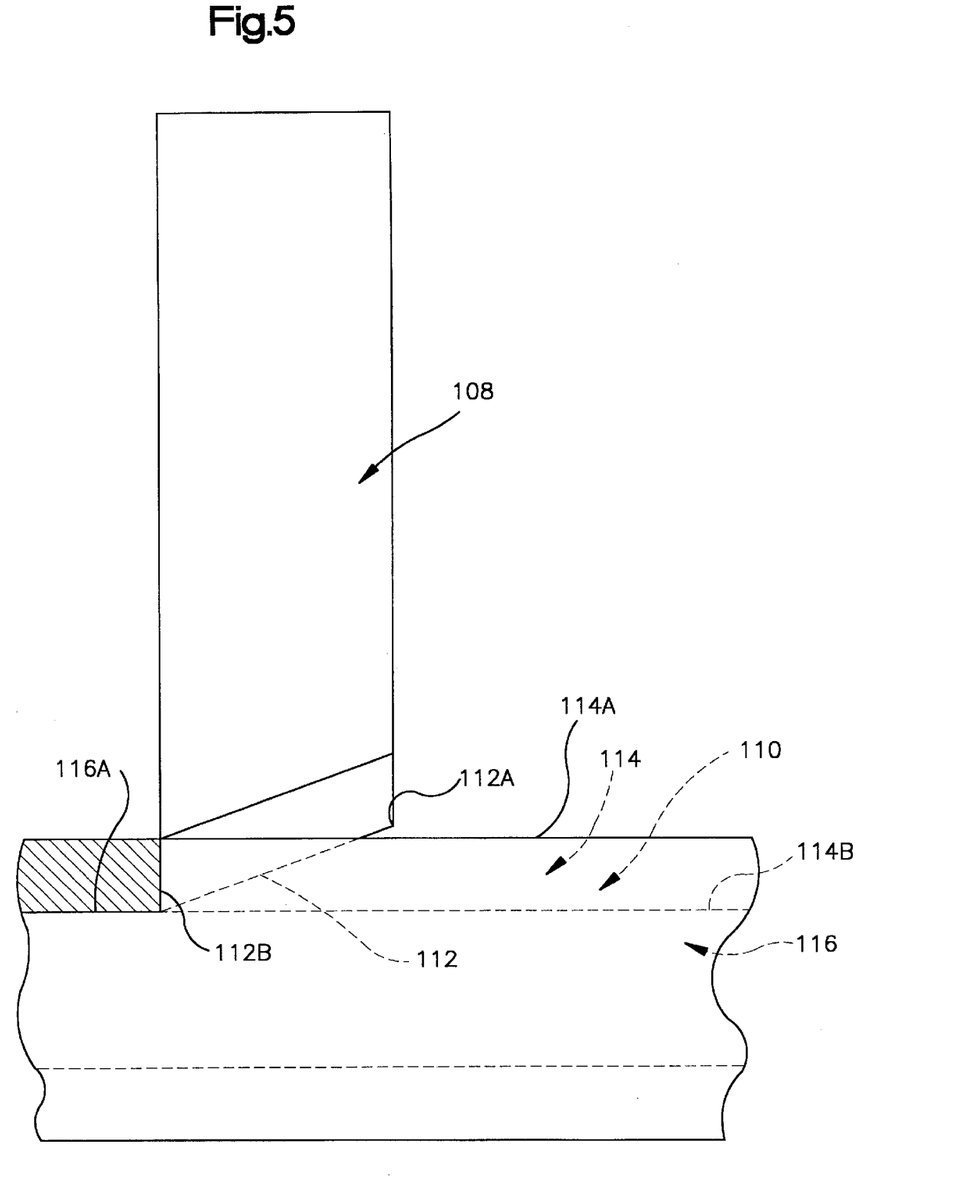
FIG. 5 is an enlarged fragmentary side elevational view of the slitting knife used in the preferred embodiments of the invention.

A preferred embodiment of the invention is shown in FIGS. 1 through 5. In this embodiment 100, a cast aluminum frame 102 is held in a clamping fixture 104 by means of set screw 105. A flange 107 is provided to the base of the clamping fixture 104 for convenience in securing the clamping fixture to a work bench or the like. A two-piece knife clamping bracket 106 holds a wire insulation slitting knife 108 in vertical alignment with the center of an insulated wire workpiece 110. Referring to FIG. 5, in slitting position, the upstream portion 112A of cutting edge 112 of the knife 108 first penetrates the outer surface 114A of wire insulation 114, followed by downstream portion 112B which comes to rest at the boundary of the inner surface 114B of the insulation 114 and the outer surface 116A of the wire metal core 116. The insulated wire is positioned for slitting on a hexahedron nylon block 118 mounted on the shank 121 of a threaded cap screw 120 which extends horizontally through a plain bore hole 122 machined in side 124 of frame 102. A horizontally aligned threaded hole 126 is machined in side 128 of frame 102 to receive the threaded end 130 of cap screw 120. Hole 136 of nylon block 118, FIG. 4, is sized to provide a snug fit between the shank 121 of cap screw 120 and hole 136. To prevent block 118 from rocking on cap screw shank 121, the bottom edges 133L and 133R of wire guides 132L and 132R make sliding contact with bottom interior surface 129 of frame 102.

The pair of wire guides in the form of wire guide plates 132L and 132R are provided with rectangular holes 134, FIG. 4, sized to provide a sliding fit between the wire guides and block 118. Wire guides 132L and 132R are, therefore, manually shiftable along the longitudinal axis of block 118. When an insulated wire 110 is placed on the top surface 138 of block 118, wire guides 132L and 132R are brought into tangential contact with the periphery of an insulated wire 110, and then axially shifted to bring the vertical diameter 140 of the wire 110 into vertical alignment with the cutting edge 112 of slitting knife 108. The wire guides 132 are then locked into place with set screws 142.

Knife clamping bracket 106, best shown in cross section in FIG. 3, comprises a left segment 144L and a right segment 144R. Left segment 144L includes a first sliding surface 146 suitable for vertically sliding against interior wall surface 148 of side 128 of frame 102. A second sliding surface 150, normal to sliding surface 146, is suitable for vertically sliding against exterior wall surface 152 of side 128 of frame 102. A knife positioning slot 154 is cut into surface 156 of segment 144L and a threaded hole 158 is provided adjacent knife positioning slot 154.

Right segment 144R has essentially the same configuration as left segment 144L, but for engagement with side 124 of frame 102. Thus, a sliding surface 160 is provided for sliding engagement adjacent interior wall surface 162 of side 124 of frame 102, and a sliding surface 164 is provided normal to wall surface 162 for vertically sliding against frame wall surface 166. A plain hole 168 is provided in segment 144R concentric with threaded hole 158 of segment 144L when both segments are in place between interior wall surfaces 148 and 162 of frame sides 128 and 124, respectively. A cap screw 170 is first received through plain hole (i.e. unthreaded) 168 to make threaded engagement with threaded hole 158 of segment 144L. By turning cap screw 170 through access hole 172 in frame side 124, segment 144L is drawn into pressure bearing contact with segment 144R so that segments 144L and 144R function as an integral clamping bracket. To further this purpose, a threaded hole 174 is provided in segment 144R normal to and in alignment with knife positioning slot 154 of segment 144L. A set screw 176 is threadedly received in threaded hole 174. By turning set screw 176 through access hole 178 in frame side 124, the slitting knife 108, placed in knife positioning slot 154, is secured in the knife clamping bracket 106. When the segments 144L and 144R are thus secured together by cap screw 170, flanges 180 and 182 permit vertical movement of the knife clamping bracket 106 but prevent lateral movement.

As shown in FIGS. 1, 6, 7 and 8, a pair of aligned matching slots 184L and 184R are milled in segments 144L and 144R, respectively, to slidably enclose and secure the collar end 186 of the threaded shaft 188. Threaded shaft 188 engages threaded hole 190, vertically formed in the top portion 192 of frame 102. By appropriately rotating knurled handle 194, threaded shaft 188 will vertically shift knife 108 into or out of slitting engagement with insulated wire 110. Once the knife is brought into slitting engagement with insulated wire 110, the threaded shaft 188 may be locked in place by set screw 196.

In operation, the frame 102 is rigidly secured in an upright position, such as by clamping the frame in fixture 104, or in other similar means, such as a vise. If fixture 104 is used, flanges 107, for instance, may be secured to a work bench by threaded fasteners or the like. An insulated wire 110 is placed in the wire-receiving passageway defined by spaced-apart frame sides 124 and 128. It is then threaded between wire guides 132L and 132R and over the top surface 138 of nylon block bridge member 118, FIGS. 2 and 4. Wire guides 132L and 132R are adjusted to bring insulated wire 110 into alignment with cutting edge 112 of slitting knife 108, FIG. 1. Knurled handle 194 is then turned to index threaded shaft 188 downwardly sufficiently to cause cutting edge 112 to penetrate insulation 114 to the depth of the metal core 116. Threaded shaft 188 may then be locked in place by means of set screw 196. The insulated wire 110 is then pulled through the frame 102 in a substantially horizontal direction while at the same time separating the slit insulation 114 from the bare metal wire 116. The slitting operation may be intermittent or continuous until the end of the wire has passed beneath the slitting knife 108 of the frame 102.

Figures 6, 8:
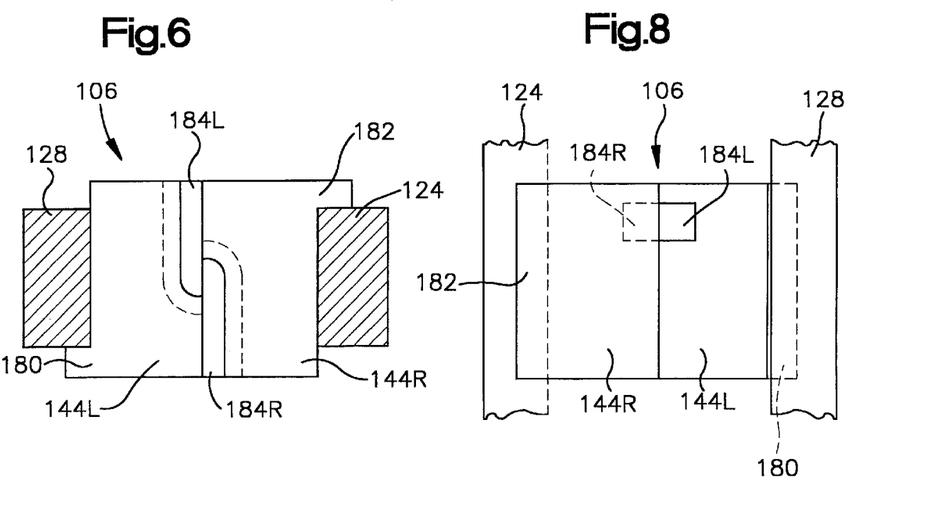
FIG. 6 is an enlarged plan view, partially in section, of the knife-holding bracket shown in FIG. 1.
FIG. 8 is an enlarged fragmentary rear elevational view of the knife-holding bracket of FIG. 6.
Figure 7:
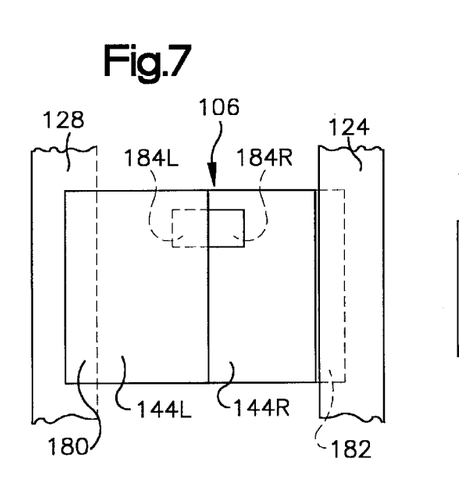
FIG. 7 is an enlarged fragmentary front elevational view of the knife-holding bracket of FIG. 6.
Figure 9:
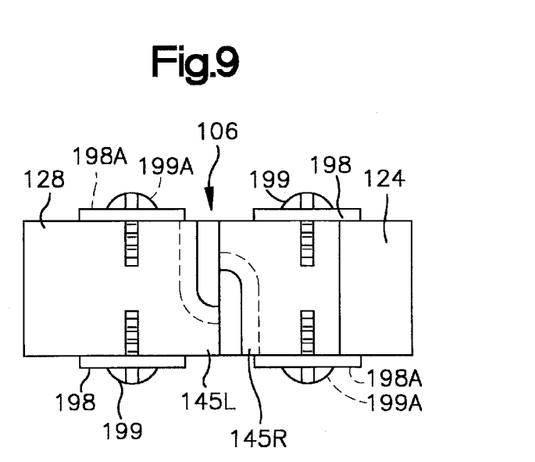
FIG. 9 is an enlarged plan view, partially in section, of another embodiment of the knife-holding bracket for use in the preferred embodiments of the invention.

FIG. 9 shows a knife-clamping bracket 106A which is a modification of knife-clamping bracket 106, shown in FIGS. 6, 7, and 8. In lieu of the flanges 180 and 182, shown in FIGS. 6, 7, and 8, to guide the vertical movement of knife-clamping bracket 106 within frame side walls 124 and 128 of frame 102, bracket 106A utilizes washers 198 which overlap side walls 124 and 128 and are held in place by metal screws 199. The washers 198 function the same as flanges 180 and 182 of bracket 106.

Figure 10:
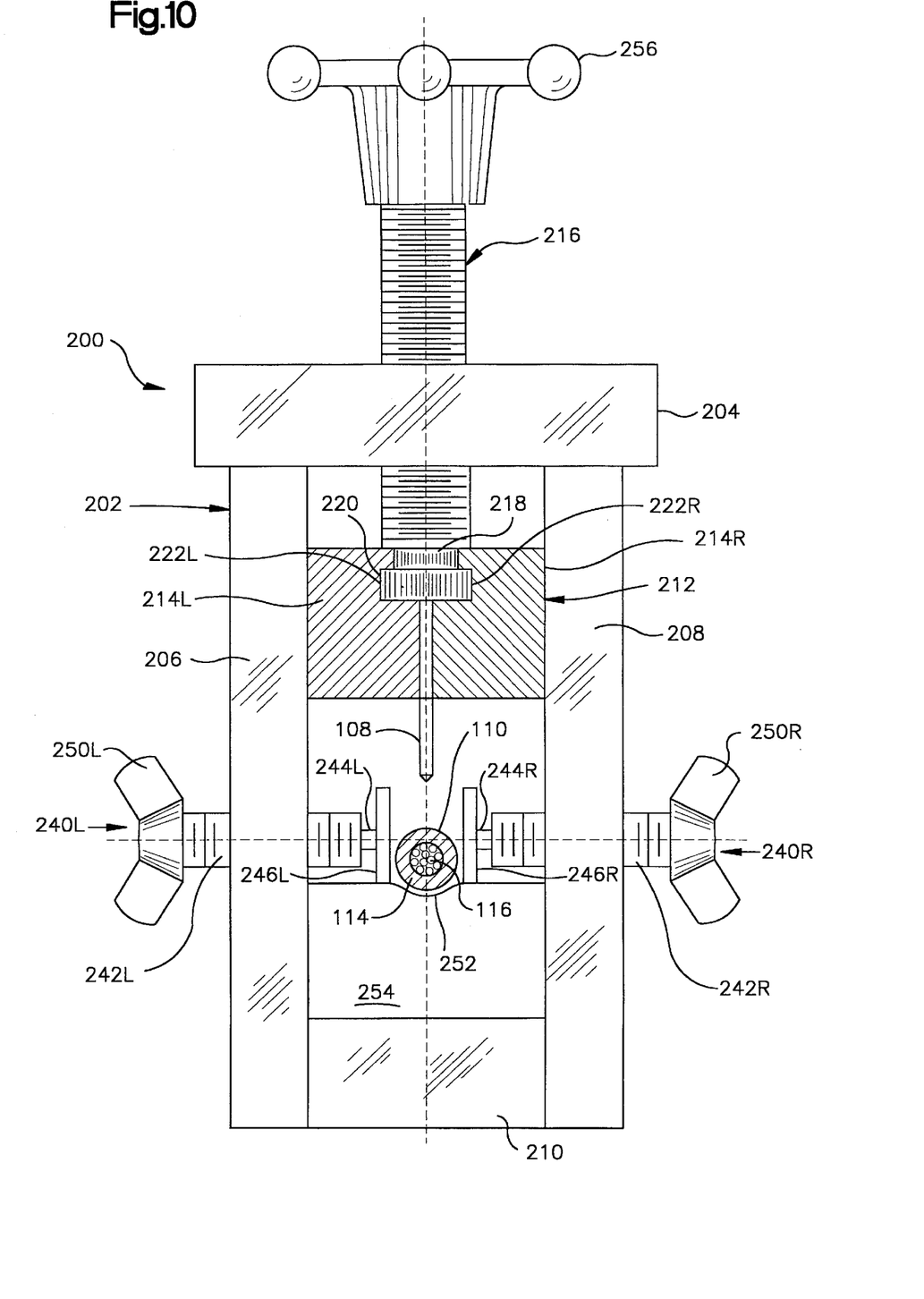
FIG. 10 is a front elevational view, partially in section, of another preferred embodiment of the invention.

Another preferred embodiment of the invention is shown in FIG. 10. The device, generally identified by the numeral 200, comprises a frame 202 which includes a lintel 204, resting on and secured to a pair of horizontally spaced-apart side members 206 and 208. Establishing proper spacing between the side members is a bottom spacer member 210. The components of the frame are secured together by threaded fasteners. In the preferred embodiment of the invention shown in FIG. 10, lintel 204 is 3"×1"×¾"; bottom spacer member is 1 ½"×1"×¾"; and side members 206 and 208 are each 4 ½"×1"×½". There is no criticality in these dimensions, and no limitation in size of the invention should be inferred from their recitation. The dimensions do, however, set forth the best mode contemplated by the inventor of carrying out his invention.

A knife-clamping bracket 212 has left and right component members 214L and 214R which are adapted to clamp a knife 108 therebetween by essentially the same means disclosed in bracket 106 of FIG. 3. Screw 216 is threadedly mounted in lintel 204 and engages bracket members 214L and 214R with a shank 218 and collar 220 that rotatably fit in matching split grooves 222L and 222R. See FIG. 11 for a plan view of the matching split grooves 222L and 222R.

Figure 11:
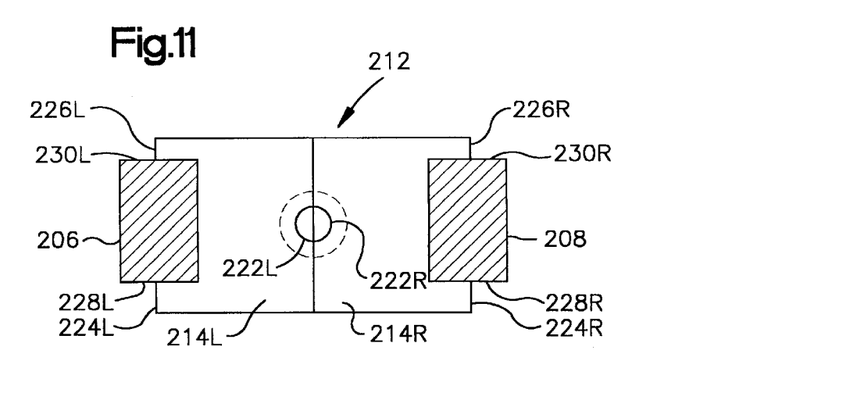
FIG. 11 is an enlarged plan view, partially in section, of a knife-holding bracket for use in the preferred embodiment of the invention shown in FIG. 10.

The screw 216 and bracket 212 are assembled before the lintel 204 is fastened to side members 206 and 208. As shown in FIG. 11, left and right flanges 224L and 224R and 226L and 226R are therefore provided to embrace the front and rear vertical surfaces 228L and 228R and 230L and 230R, respectively, of side walls 206 and 208.

Figure 1:
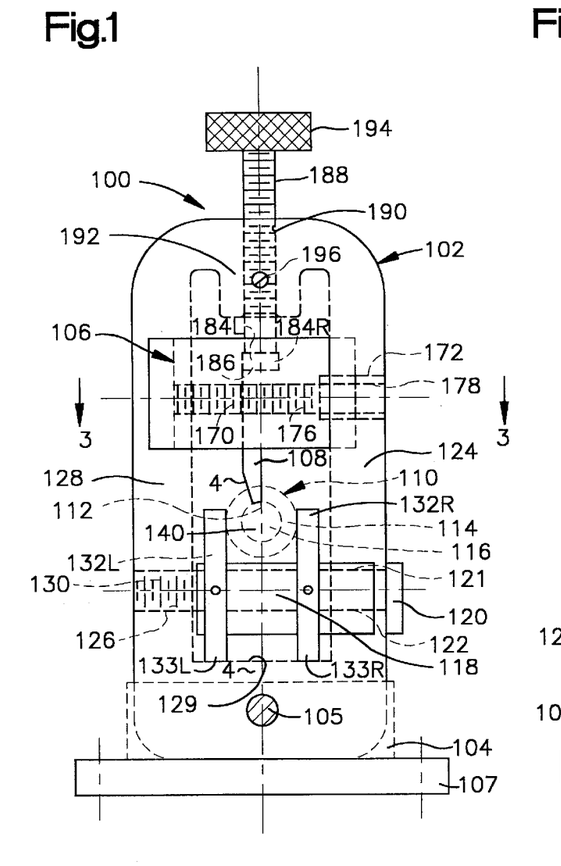
FIG. 1 is a front elevational view of a preferred embodiment of the invention.

The use of four guide flanges is not possible in the embodiment of the invention shown in FIGS. 1 and 3 because the one-piece frame requires side entry assembly of bracket members 144L and 144R, wherein the use of only two guide flanges 180 and 182 is possible. Although bracket 106A of FIG. 9 is also designed for side entry assembly, the same as shown in FIG. 3, it is contemplated that two additional guide washers 198A and screws 199A, shown in phantom, may be used in addition to the two full-line guide washers 198 and screws 199 for increased stability and accuracy of the bracket 106A in guiding the knife 108 into and out of slitting engagement with the insulated wire work product 110.

Figure 12:
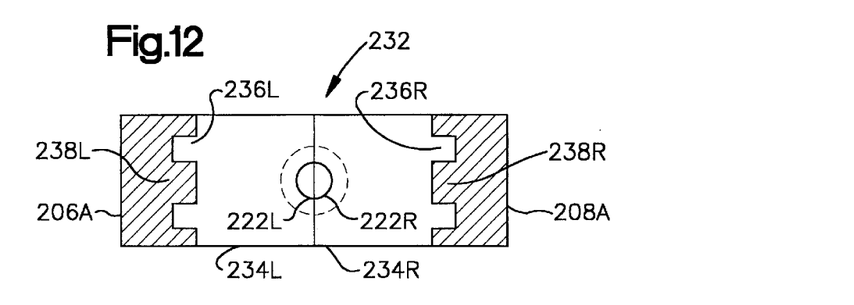
FIG. 12 is an enlarged plan view, partially in section, of another knife-holding bracket for use in the preferred embodiment of the invention shown in FIG. 10.

Another preferred embodiment of the knife-clamping bracket, for use in the inventive embodiment of FIG. 10, is shown in FIG. 12. Bracket members 234L and 234R have tongue and groove exterior side wall surfaces 236L and 236R which mate with matching tongue and groove interior side wall surfaces 238L and 238R of the frame side walls 206A and 208A. These tongue and groove matching surfaces provide for increased stability and accuracy of the bracket 232 in guiding the knife 108 into and out of slitting engagement with the insulated wire work product 110.

Figure 13:
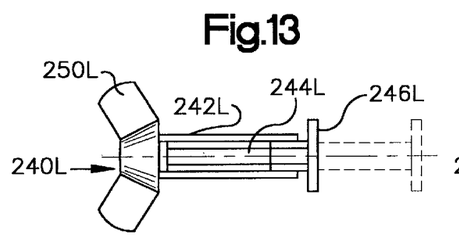
FIG. 13 is an elevational view, partially in section, of a wire alignment turn screw and plate for use in the preferred embodiment of the invention shown in FIG. 10.
Figure 14:
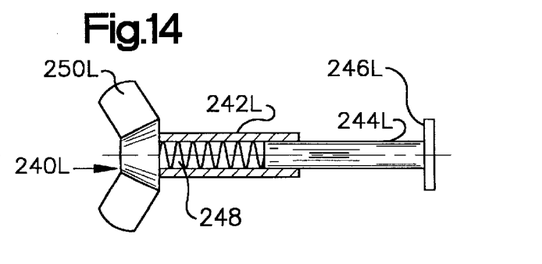
FIG. 14 is an elevational view, partially in section, of another wire alignment turn screw and plate for use in the preferred embodiment of the invention shown in FIG. 10.

Preferred embodiments of wire gap adjusting screws are shown in FIGS. 10, 13, and 14. Adjusting screws 240L and 240R comprise externally threaded sleeves 242L and 242R into which shafts 244L and 244R are slip fitted. Secured to the outboard ends of shafts 244 are rectangular plates 246L and 246R, which align the insulated wire work product 110. As shown in FIG. 13, since shafts 244 are freely slidable, they may be brought into pre-positioning contact with the work product 110 before any adjustment of the sleeves is made. Pre-setting the plates 246 minimizes the probability of misalignment of the work product when sleeves 242 are indexed into contact with plates 246.

The inventive embodiment of FIG. 14 further refines the concept of pre-positioning the work product by the insertion of light coil springs 248 in sleeves 242 between the inboard ends of shafts 244 and the finger-gripping wing nuts 250. Springs 248 gently urge shafts 244 into light pressure contact against the opposite sides of the work product to pre-position and to hold the work product in slitting position until sleeves 242 are indexed into contact against plates 246 to rigidly fix the positions of shafts 244 adjacent opposite sides of the work product 110. To assist and to expedite the work product alignment process, a V-groove 252 may be cut in nylon block 254 to locate the cross section of the work product in radial alignment with slitting knife 108. Hand grip 256, FIG. 10, is then turned to lower the cutting edge 112, FIG. 5, into slitting contact with wire insulation 114. The work product 110 may then be manually or mechanically pulled through the inventive stripping device 100, FIG. 1, or 200, FIG. 10, until the metal core 116 of the work product has been fully separated from its insulation 114.

Figures 15, 16, 17, 18, 19:
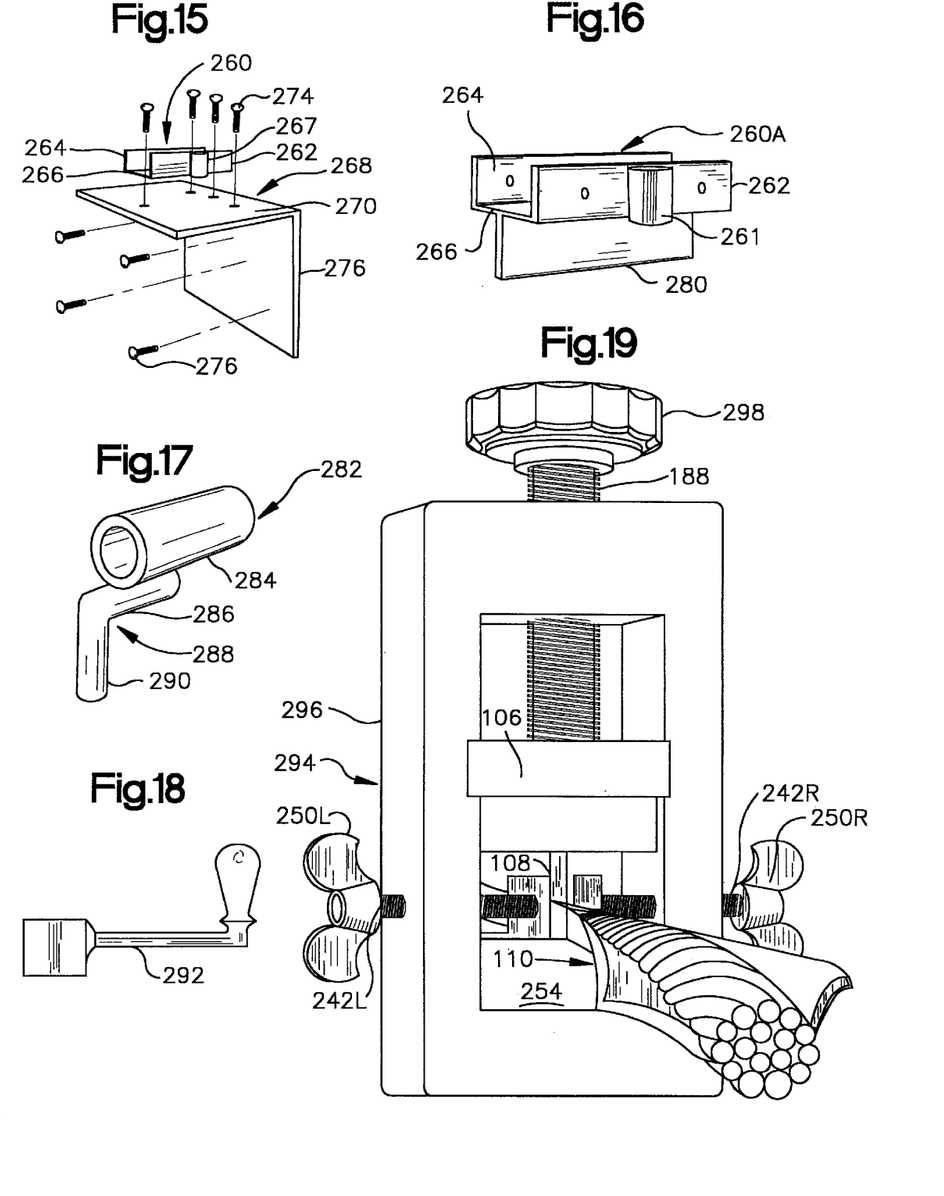

FIG. 15 shows a U-shaped wire stripping tool holder 260, similar to wire stripping tool holder 104 of FIGS. 1 and 2, comprising a channel member having side walls 262 and 264 and a bottom web-like member 266. Secured to side wall 262 is a gudgeon sleeve 267 to receive the gudgeon pin portion of a wire guide shown in FIG. 17. The tool holder 260 is fastened to an angle iron 268 having a horizontal flange 270 and a vertical flange 272. Threaded fasteners 274 secure the bottom member 266 of tool holder 260 to horizontal flange 270 of angle iron 268. Threaded fasteners 276 secure angle iron 268 to a work station, such as a workbench or the like.

The wire stripping tool holder 260A of FIG. 16 is similar to tool holder 260 of FIG. 15, wherein like parts are designated by like numerals. However, tool holder 260A is distinguishable from tool holder 260 in that a vertical flange 280 is permanently secured to the underside of bottom member 266 extending longitudinally along the underside of bottom member 266 and spaced midway between side walls 262 and 264. Vertical depending flange 280 is used for securing the tool holder 260A in a vise or the like.

FIG. 17 shows a wire guide 282 having a sleeve 284 permanently secured to the horizontal leg 286 of L-shaped gudgeon member 288. Vertical gudgeon pin 290 is sized to freely slip fit into tool holder gudgeon sleeve 267 of the tool holders 260 and 260A of FIGS. 15 and 16, respectively. The wire guide 282 comes in a variety of internal diameter sizes of sleeve 284 in order to accommodate and properly guide insulated wire into the wire stripping devices of FIGS. 1 and 19.

FIG. 18 discloses a crank 292 for use in cranking the wire insulation slitting blade 108 of FIG. 1 into and out of slitting engagement with the insulation of the insulated wire work product 110.

FIG. 19 discloses another preferred embodiment of the inventive wire stripping device 294 having a frame 296 and a slitting knife 108 secured in a knife clamping bracket 106. The knife clamping bracket 106 is, in turn, secured to a threaded shaft 188, which is rotatable by a circular handle 298 to vertically index knife 108 up or down, as required, to slit insulated wire work product 110. Crank 292 of FIG. 18 may be substituted for handle 298 if greater leverage is required to pierce more resistant insulations. The side thrust threaded shafts 242L and 242R are the same as shown and described with respect to FIGS. 13 and 14.

It will occur to those skilled in the art, upon reading the foregoing description of the preferred embodiments of the invention, taken in conjunction with a study of the drawings, that certain modifications may be made to the invention without departing from the intent or scope of the invention. It is intended, therefore, that the invention be construed and limited only by the appended claims.

I claim:

1. A bench-mountable electrical wire insulation stripping device for electrical wire conductors having solid metal cores encased in insulation comprising: a wire insulation slitting frame having a top portion and a bottom portion and spaced-apart first and second vertical side portions each secured to said top and to said bottom portions to define a wire-receiving passageway through said frame, said first and second vertical side portions having respectively first and second internal vertical surfaces; a wire insulation slitting knife secured to a slitting knife holder and disposed in said passageway to penetrate the thickness of the wire insulation to be slit, said slitting knife having a knife edge to slit said insulation radially inward from an outer surface of said insulation; indexing means secured to said frame and to said slitting knife holder to selectively and vertically index said slitting knife toward and away from said bottom portion; wire guide means secured to said frame to center said wire conductors beneath said slitting knife; said slitting knife holder including first and second vertically slidable brackets and means to secure said slitting knife between said slidable brackets, said first slidable bracket having a first face in sliding contact with said first internal vertical surface, and a second face normal to said first face in sliding contact with an external surface of said frame first side portion; said means to secure said slitting knife including a vertical slitting knife groove in said first slidable bracket slidably receiving said slitting knife to vertically align said slitting knife in a position to the slit wire insulation; said second slidable bracket having a first face in sliding contact with said second internal vertical surface, and a second face of said second slidable bracket being normal to said first face of said second slidable bracket and in sliding contact with an external surface of said frame second side portion, said external surface of said frame second side portion being on the opposite side of said frame from said external surface of said frame first side portion and diagonal therefrom; a threaded bore in said first slidable bracket; a plain bore in said second slidable bracket; a threaded bore in said second slidable bracket; a cap screw received in said plain bore and threadedly received in said threaded bore in said first slidable bracket; and wherein said means to secure said slitting knife further includes a set screw in said threaded bore in said second slidable bracket extending into said vertical slitting knife groove and removably disposed against said slitting knife, whereby tightening of said cap screw rigidly secures said first and second slidable brackets together and tightening of said set screw rigidly secures said slitting knife in said vertical slitting knife groove.

2. The device of claim 1, including a first access hole in said frame second side portion alignable with said plain bore in said second slidable bracket and sized to permit said cap screw to pass therethrough, and a second access hole in said frame second side portion alignable with said threaded bore in said second slidable bracket and sized to permit said set screw to pass therethrough, whereby said first and second brackets are positioned between said first and second frame side portions with said slitting knife in place in said slitting knife groove and thereafter are secured therebetween by passing and threadedly engaging said cap screw through said first access hole, and whereby said slitting knife is secured in said slitting knife groove by turning said set screw into pressure engagement with said slitting knife through said second access hole.

3. A bench-mountable electrical wire insulation stripping device for electrical wire conductors having solid metal cores encased in insulation comprising: a wire insulation slitting frame; said frame including opposed portions forming a wire-receiving passageway through said frame, said opposed portions including first and second vertical side portions with first and second internal vertical surfaces, respectively; a wire insulation slitting knife secured to a slitting knife holder and disposed in said passageway to penetrate the thickness of the wire insulation, said slitting knife having a knife edge to slit said insulation radially inward from an outer surface of said insulation; indexing means secured to said frame and to said slitting knife holder to selectively and vertically index said slitting knife within said passageway; wire guide means secured to said frame to center said wire conductors beneath said slitting knife; said slitting knife holder including first and second vertically slidable brackets and means to secure said slitting knife between said slidable brackets, wherein said first slidable bracket has a first face in sliding contact with said first internal vertical surface, and a second face normal to said first face in sliding contact with an external surface of said frame first side portion; said means to secure said slitting knife including a vertical slitting knife groove in said first bracket slidably receiving said slitting knife to vertically align said slitting knife in a position to slit the wire insulation; said second slidable bracket having a first face in sliding contact with said second internal vertical surface, and a second face of said second slidable bracket being normal to said first face of said second slidable bracket and in sliding contact with an external surface of said frame second side portion, said external surface of said frame second side portion being on the opposite side of said frame from said external face of said frame first side portion and diagonal therefrom; a threaded bore in said first slidable bracket; a plain bore in said second slidable bracket; a threaded bore in said second slidable bracket; a cap screw received in said plain bore and threadedly received in said threaded bore in said first slidable bracket; and wherein said means to secure said slitting knife further includes a set screw in said threaded bore in said second slidable bracket extending into said vertical slitting knife groove and removably disposed; whereby tightening of said cap screw rigidly secures said first and second slidable brackets together and tightening of said set screw rigidly secures said slitting knife in said vertical slitting knife groove.

4. The device of claim 3, including a first access hole in said frame second side portion alignable with said plain bore in said second slidable bracket and sized to permit said cap screw to pass therethrough, and a second access hole in said frame second side portion alignable with said threaded bore in said second slidable bracket and sized to permit said set screw to pass therethrough, whereby said first and second brackets are positioned between said first and second frame side portions with said slitting knife in place in said slitting knife groove and thereafter are secured therebetween by passing and threadedly engaging said cap screw through said first access hole, and whereby said slitting knife is secured in said slitting knife groove by turning said set screw into pressure engagement with said slitting knife through said second access hole.

5. The device of claim 3 wherein said indexing means comprises a vertically aligned threaded bore in a top portion of said frame and an indexing shaft threadedly received in said threaded bore; and said shaft having a lower end secured to said slitting knife holder.

6. The device of claim 5, wherein said wire guide means include wire guide plates each mounted on a respective horizontal shaft and threaded sleeves each threadedly mounted to a respective one of said first and second vertical side portions, wherein each horizontal shaft is slidably received within said respective threaded sleeves, and including spring means in said threaded sleeves to urge said shafts inwardly toward each other and toward said electrical wire conductors supported on said platform.

7. The device of claim 3, wherein said wire guide means comprise a pair of horizontally opposed threaded sleeves, respectively having inboard and outboard ends, said sleeves being threadedly mounted and axially aligned in said first and second vertical side portions respectively of said frame; turning means on said outboard ends of said sleeves; wire guide plates mounted on said inboard ends of said sleeves; and a platform secured between said first and second side portions to support an underside of said electrical conductors.

8. The device of claim 5, including a wire centering V-notch on an upper surface of said platform.

9. The device of claim 7, wherein said wire guide plates are each mounted on a respective horizontal shaft, and said shafts are slidably received within said respective threaded sleeves.

10. A bench-mountable electrical wire insulation stripping device for electrical wire conductors having metal cores encased in insulation comprising: a wire insulation slitting frame having a top portion and a bottom portion and spaced-apart first and second vertical side portions each extending between and secured to said top and said bottom portions to define a wire-receiving passageway through said frame, said first and second vertical side portions having first and second internal vertical surfaces, respectively; a wire insulation slitting knife secured to a knife clamping bracket and disposed in said passageway to penetrate the thickness of wire insulation, said slitting knife having an edge to slit said insulation radially inward from an outer face of said insulation; indexing means secured to said knife clamping bracket to vertically index said slitting knife; horizontally adjustable wire guide means to align said electrical conductors beneath said slitting knife, and said knife clamping bracket vertically slidably secured between said first and second internal vertical surfaces, said bracket comprising left- and right-hand portions and knife mounting means for adjustably securing said slitting knife between said bracket portions, each portion having abutting inboard faces, said bracket portions each having spaced-apart flange portions remote from said abutting inboard portions to embrace, respectively, said frame vertical side portions to vertically guide said bracket between said frame vertical side portions, said bracket portions being releasably secured together and said knife mounting means adjustably securing said slitting knife to extend from between said slidable brackets in said passageway to penetrate the thickness of wire insulation.

11. The device of claim 10, wherein said bracket portions are releasably secured together by a threaded fastener and said knife mounting means comprise a set screw threadedly engaging one of said bracket portions and biasing said slitting knife against the other of said bracket portions.

12. A bench-mountable electrical wire insulation stripping device for electrical conductors having metal cores encased in insulation comprising: a wire insulation slitting frame having a top portion and a bottom portion and spaced-apart first and second vertical side portions each extending between and secured to said top and said bottom portions to define a wire-receiving passageway through said frame, said first and second vertical side portions having first and second internal vertical surfaces, respectively; a wire insulation slitting knife secured to a knife clamping bracket and disposed in said passageway to penetrate the thickness of the wire insulation, said slitting knife having an edge to slit said insulation radially inward from an outer face of said insulation; indexing means secured to said knife clamping bracket to vertically index said slitting knife within said wire-receiving passageway; and horizontally adjustable wire guide means to align said electrical conductors beneath said slitting knife, said knife clamping bracket vertically slidably secured between said first and second internal vertical surfaces, said knife clamping bracket including first and second bracket portions and knife mounting means to secure said slitting knife between said bracket portions, said bracket portions being releasably secured together with said knife mounting means adjustably securing said slitting knife to extend from between said bracket portions in said passageway to penetrate the thickness of said wire insulation, wherein said first and second internal vertical surfaces of said frame are tongue and groove configured, said first and second bracket portions each having a tongue and groove configured face in slidable contact with a respective one of said first and second internal surfaces, respectively, to mate with said tongue and groove configured first and second internal vertical surfaces of said frame.

13. The device of claim 12, further comprising: in combination, a stripping device frame holder and a wire guide, said holder comprising a channel-shaped member receiving said stripping device frame bottom portion therein; said wire guide comprising a cylindrical sleeve to freely receive an electrical conductor therein and to align said electrical conductor with said stripping device frame wire-receiving passageway, and securing means to secure said wire guide to said device frame holder.

14. The combination of claim 13, including means to secure said stripping device frame holder to a work station.

15. The combination of claim 14, wherein said channel-shaped member comprises a pair of parallel spaced-apart first and second vertical sides and a horizontal web therebetween interconnecting said vertical sides, said horizontal web having an underside, and a vertically aligned gudgeon sleeve secured to said first vertical side; and wherein said securing means comprises a vertical gudgeon pin secured to said cylindrical sleeve and received in said gudgeon sleeve to secure said wire guide to said device frame holder.

16. The combination of claim 15 wherein, said means to secure said stripping device frame holder to said work station comprises an L-shaped bracket having a horizontal member and a vertical member; means to secure said tool frame holder to said horizontal member; and means to secure said vertical member to said work station.

17. The combination of claim 15 wherein, said means to secure said stripping device frame holder to said work station comprises a flat plate member depending vertically from the underside of said horizontal web, whereby said flat plate is receivable between the jaws of a clamping device.

\* \* \* \* \*